(12) United States Patent
Sobey

(10) Patent No.: US 6,483,297 B2
(45) Date of Patent: Nov. 19, 2002

(54) METHOD AND APPARATUS FOR CHARACTERIZING ASYMMETRIES OF AN MR HEAD

(75) Inventor: Charles H. Sobey, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/752,221

(22) Filed: Dec. 29, 2000

(65) Prior Publication Data
US 2002/0084781 A1 Jul. 4, 2002

(51) Int. Cl.[7] .......... G01R 33/12; G06F 19/00; B11B 27/36
(52) U.S. Cl. .......... 324/210; 324/210; 324/212; 360/25; 360/31; 702/66
(58) Field of Search .......... 324/210, 211, 324/212; 360/25, 31; 702/66

(56) References Cited

U.S. PATENT DOCUMENTS

| 5,416,432 | A | | 5/1995 | Lewis | |
|---|---|---|---|---|---|
| 5,790,335 | A | * | 8/1998 | Sugawara et al. | 360/68 |
| 6,025,712 | A | * | 2/2000 | Mian | 324/210 |
| 6,043,943 | A | * | 3/2000 | Rezzi et al. | 360/46 |
| 6,104,556 | A | * | 8/2000 | Schaenzer | 360/25 |
| 6,147,828 | A | * | 11/2000 | Bloodworth et al. | 360/65 |
| 6,163,419 | A | | 12/2000 | Sobey | |

OTHER PUBLICATIONS

Shariatdoust, et al., "An Integrating Servo Demodulator for Hard Disk Drives", IEEE 1993 cus. Integ. Cir. Conf., pp. 10.6.1–10.6.5, 1993.

* cited by examiner

Primary Examiner—Edward Lefkowitz
Assistant Examiner—Darrell Kinder
(74) Attorney, Agent, or Firm—W. Daniel Swayze, Jr.; W. James Brady; Frederick J. Telecky, Jr.

(57) ABSTRACT

A method and apparatus for characterizing asymmetries of a magneto-resistive type head in proximity to a magnetic media such as a magnetic disk of a hard disk drive. The method includes using the magneto-resistive type head to read a continuous signal from the magnetic media to provide a read back signal. Energies contained in the read back signal which occur in excess of a predetermined threshold for the positive and negative portions of the read back signal are then determined. The energies may be determined by accumulating sampled signal values from the read back signal in registers during times at which the read back signal exceeds the threshold.

29 Claims, 3 Drawing Sheets

METHOD AND APPARATUS FOR CHARACTERIZING ASYMMETRIES OF AN MR HEAD

BACKGROUND OF THE INVENTION

1. Field of the Invention

This invention relates to improvements in manufacturing and operating techniques for mass data storage devices, and the like, and more particularly to improvements in methods and apparatuses for characterizing asymmetries of an MR read head, or the like, for use therein.

2. Relevant Background

Mass data storage devices include tape drives, as well as hard disk drives that have one or more spinning magnetic disks or platters onto which data is recorded for storage and subsequent retrieval. Hard disk drives may be used in many applications, including personal computers, set top boxes, video and television applications, audio applications, or some mix thereof. Many applications are still being developed. Applications for hard disk drives are increasing in number, and are expected to further increase in the future.

One class of mass data storage devices to which the present invention has particular applicability is hard disk drive systems. A hard disk drive system typically includes a rotating magnetic disk on which information is recorded. A read transducer is movably supported adjacent the magnetic disk for reading the prerecorded information from the disk. The read transducer typically flies above the surface of the disk, being supported by an "air bearing" that is created by the spinning disk, so that the transducer does not touch the surface of the disk in normal operation.

Recently, magnetoresistive (MR) heads have been gaining wide popularity for use as the read transducer. The term "magnetoresistance" refers to the change in resistivity of the materials of the head in the presence of a magnetic field. The introduction of MR heads into disk drives has significantly increased the areal density. However, due to the characteristics of the head materials, changes in resistance in response to equal positive and negative magnetic fields are not necessarily symmetrical. This is referred to as head "asymmetry".

Typically, a circuit is included in the read channel of the mass data storage device in which the MR head is employed to compensate for such asymmetrical signal responses. However, the asymmetrical responses are in large part nonlinear, and are difficult to assess and compensate.

What is needed, therefore, is a method for more accurately characterizing asymmetries of an MR head in a mass data storage device, or the like.

SUMMARY OF THE INVENTION

In light of the above, therefore, it is an object of the invention to provide a method for characterizing asymmetries of an MR head in a mass data storage device, or the like.

This and other objects, features and advantages of the invention will be apparent to those skilled in the art from the following detailed description of the invention, when read in conjunction with the accompanying drawings and appended claims.

According to a broad aspect of the invention, a method is disclosed for characterizing asymmetries of a magneto-resistive type head in proximity to a magnetic media, such as a magnetic disk of a hard disk drive, or the like. The method includes using the magneto-resistive type head to read a continuous signal from the magnetic media to provide a read back signal. Energies contained in the read back signal which occur in excess of a predetermined threshold for the positive and negative portions of the read back signal are then determined. The energies may be determined by accumulating sampled signal values from the read back signal during times at which the read back signal exceeds the threshold.

According to another broad aspect of the invention, a method is disclosed for characterizing asymmetries of a magneto-resistive type head in proximity to a magnetic media. The method includes writing a continuous signal onto the magnetic media, and using the magneto-resistive type head, reading back the continuous signal to provide a read back signal. The positive and negative portions of the read back signal are then compared to a threshold value, and energies contained in the read back signal occurring in excess of the threshold value for the positive and negative portions of the read back signal are determined, for example by accumulating sampled signal values from the read back signal during times at which the read back signal exceeds the threshold.

According to another broad aspect of the invention, an apparatus for determining asymmetries of a magneto-resistive type head in proximity to a magnetic media is disclosed. The apparatus includes a comparator for determining when positive and negative signals produced by the head in reading a continuous signal from the disk exceed known thresholds, and an energy determining circuit for measuring energies contained in the positive and negative read back signals when the read back signals exceed the thresholds. The energy determining circuit may include a circuit for sampling the read back signals at least during times at which the read back signal exceeds the threshold to produce sampled signal values therefrom, and an accumulator for accumulating the sampled signal values.

BRIEF DESCRIPTION OF THE DRAWINGS

The invention is illustrated in the accompanying drawings, in which.

In the various figures of the drawing, like reference numerals are used to denote like or similar parts.

DETAILED DESCRIPTION OF THE PREFERRED EMBODIMENTS

Figure 1:
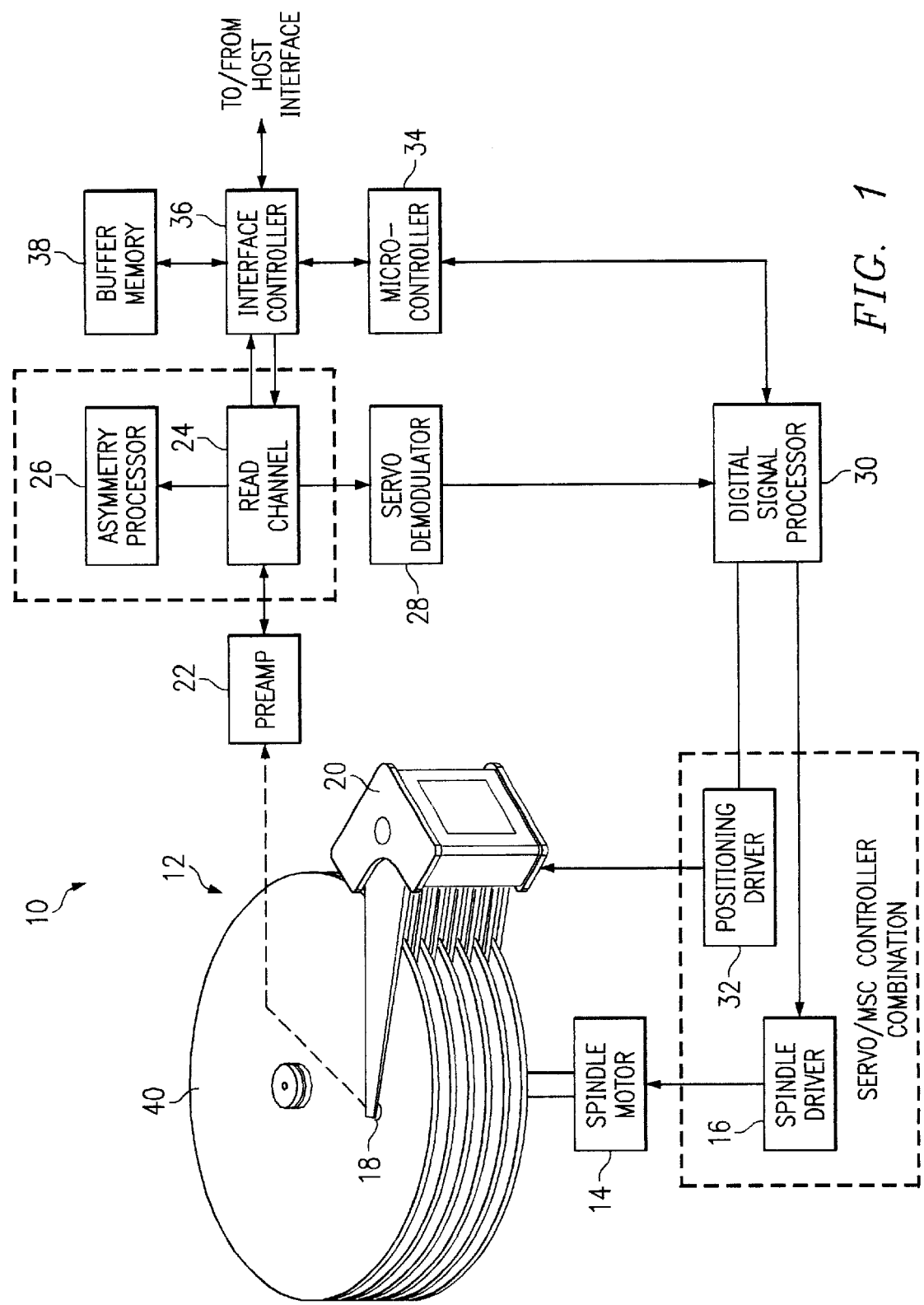
FIG. 1 is a block diagram of a generic disk drive system, illustrating one general environment in which the invention may be practiced.

FIG. 1 is a block diagram of a generic disk drive system 10, which represents one general environment in which the invention may be practiced. It should be noted that although the invention is described in the context of a hard disk drive with a rotating magnetic media, the invention may be equally advantageously employed in other environments which use a magneto-resistive head that changes its electrical characteristics in the presence of magnetic flux from an associated magnetic media. The circuit 10 represents a method and apparatus for practicing the invention in which asymmetries may be detected during the operation of a mass data storage device, for example in its initial characterization during manufacture of the device.

The system 10 includes a magnetic media disk stack 12 that is rotated by a spindle motor 14 and spindle driver circuit 16. A data transducer or head 18 is locatable along selectable radial tracks (not shown) of the disk stack 12 by a voice coil motor 20. The radial tracks may contain magnetic states that contain information, such as track identification data, location information, synchronization data, user data, and so forth. The head 18, which may be a magneto-resistive (MR) head, is used to both record user data to and read user data back from the disk. The head 18 may also be used to detect signals that identify the tracks and sectors at which data is written, to detect servo bursts that enable the head to be properly laterally aligned with the tracks of the disk, and so on.

Analog electrical signals that are generated by the head 18 in response to the magnetic signals recorded on the disk are preamplified by a preamplifier 22 for delivery to read channel circuitry 24, which includes an asymmetry processing circuit 26, as below described in detail. Servo signals are detected and demodulated by one or more servo demodulator circuits 28 and processed by a digital signal processor (DSP) 30 to control the position of the head 18 via a positioning driver circuit 32.

A microcontroller 34 is typically provided to control the DSP 30, as well as an interface controller 36 to enable data to be passed to and from a host interface (not shown) in known manner. A data memory 38 may be provided, if desired, to buffer data being written to and read from the disk.

Figure 2:
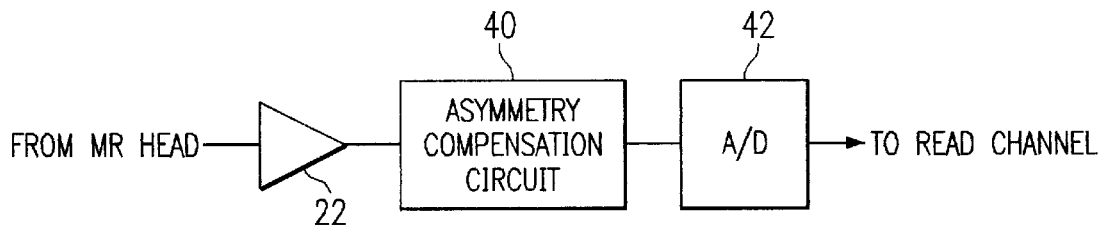
FIG. 2 is a block diagram showing a portion of a read channel of a typical hard disk drive showing an asymmetry compensation circuit that can be configured, in accordance with a preferred embodiment of the invention.

It is well known that magneto-resistive heads of the type used in the environments described herein often have nonlinear responses to positive and negative signals. Moreover, the resistance of the head may vary more in response to exposure to magnetic flux in one direction than in the other direction. This is referred to herein as "asymmetry" of the head. In the past, asymmetry circuits have been provided between the preamplifier 22 and the read channel circuitry 24 to correct for such asymmetries. In many cases, asymmetry compensation circuitry 40 is included in the read channel itself before the analog signal developed by the MR head is digitized in an analog-to-digital converter 42, as shown in FIG. 2. However, as mentioned above, because the asymmetries are nonlinear, it is difficult to accurately set up and adjust the asymmetry compensation circuitry.

Thus, according to a preferred embodiment of the invention, a method and apparatus are provided to develop information that enables MR heads to be more accurately characterized on account of the asymmetries of the head responses. This information can be used to configure the asymmetry compensation circuitry in the hard disk drive read channel. According to a preferred embodiment of the invention, this information is developed by determining the energy contained in the positive and negative signal envelopes produced by the MR head in response to a continuous signal prerecorded on the disk. (A continuous signal means a single frequency pattern or sequence written to the disk, and may include, for example, an EPR4 signal that represents a sine wave.) Once the energy information is developed, the positive and negative envelope energies can be compared and the nature of the asymmetries assessed.

Figure 3:
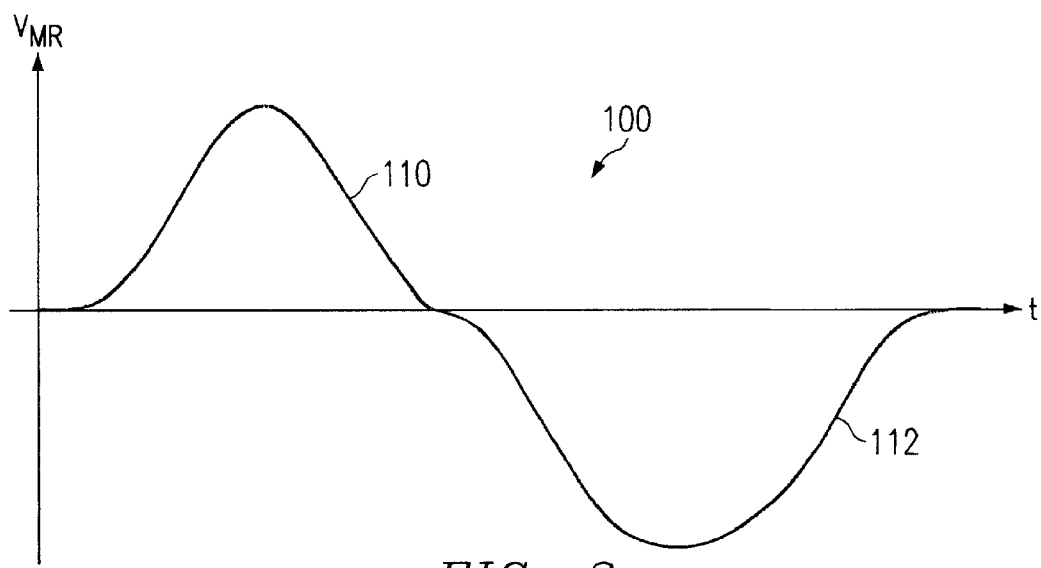
FIG. 3 is a graph of amplitude vs. time to show the preamplified analog output of an MR head with an asymmetrical response in response to a prerecorded continuous signal.

For example, a waveform 100 that represents a typical MR head response to a symmetrical, non-overlapping consecutive positive and negative signals recorded on a disk drive is shown in FIG. 3, to which reference is now additionally made. The envelope of the waveform 100 has a positive portion 110 and negative portion 112. However, the positive envelope portion 110 is not as large as the negative envelope portion 112. Such an asymmetry in the head response may result when as a normal part of the operation of the head, a signal is produced by the head in response to a prerecorded continuous signal. As a result, an appropriate signal compensation should be made to the head output before the signal is digitized by the A/D converter in the read channel of the drive.

According to a preferred embodiment of the invention, the energies contained in the respective positive and negative signal envelopes 110 and 112 of the read back signal in response to the prerecorded continuous signal of the disk are determined. This determination may be made, for example, by the integrating circuit 26 of FIG. 4, to which reference is now additionally made. A method and circuit for energy determination for positive and negative signal portions between zero crossings thereof is shown in U.S. Pat. No. 6,163,419, issued Dec. 10, 2000, entitled METHOD AND APPARATUS FOR DEMODULATING A SERVO BURST SIGNAL IN A HARD DISK DRIVE, assigned to the assignee hereof, and incorporated herein by reference.

The integrating circuit 26 includes an absolute value circuit 62, which has an input coupled to the output of the ADC 42 (FIG. 2) of the read channel 24. The absolute value circuit 62 determines and outputs the absolute value of each digital sample generated by the ADC. If the digital samples are represented by signed binary numbers, this may involve simply removing the sign bit. The absolute value circuit 62 thus operates somewhat like a full-wave rectifier circuit.

Figure 5:
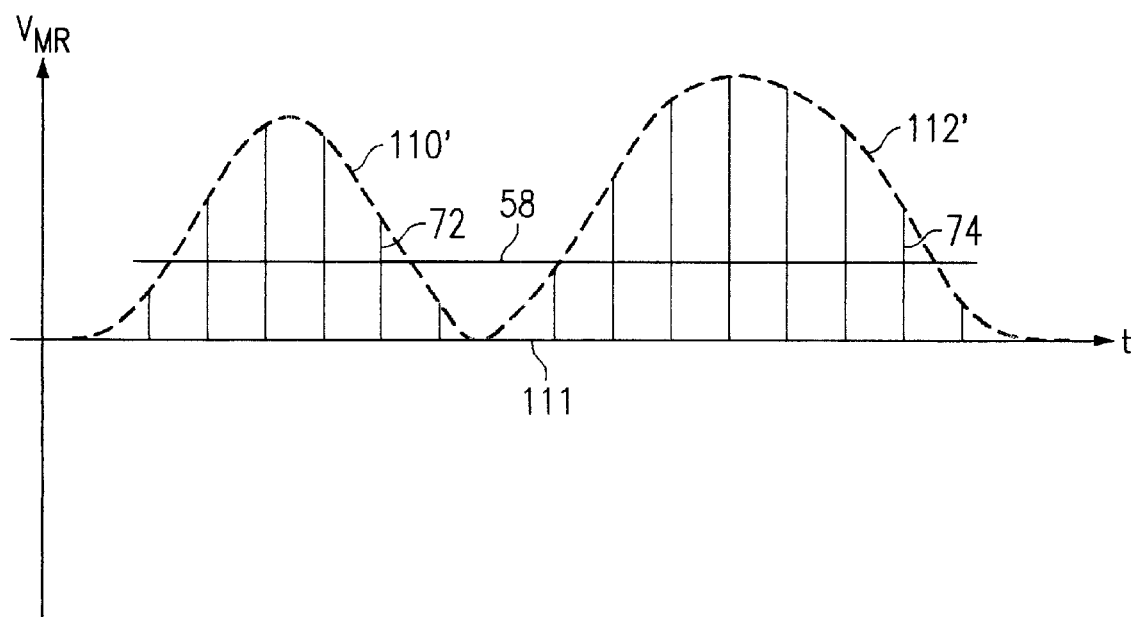
FIG. 5 is a graph of the output of a read channel analog-to-digital converter showing the sampling of the absolute value of the signal of FIG. 3.

The operation of the absolute value circuit 62 is illustrated in FIGS. 5, to which reference is now additionally made. FIG. 5 is a graph representing the output of the absolute value circuit 62 of the read channel, where the broken lines 110' and 112' represent the envelopes of the recovered and digitized signal 100, and the solid lines 72 and 74 represent the samples taken by the ADC of the rectified positive and negative signal segments. Thus, the output of the absolute value circuit 62 converts the negative samples from the ADC to positive samples, in order to effectively achieve full-wave rectification. As evident from FIGS. 3 and 5, the disclosed embodiment preferably utilizes sampling at or above the Nyquist rate, which means taking samples at a rate equal to or greater than twice the highest frequency contained in the signal. The sampling in the disclosed embodiment involves about twelve samples per full cycle of the burst signal, or, in other words, about six samples per half-cycle, although it will be recognized that the specific sampling rate can be varied within the scope of the invention.

The successive output values during a predetermined portion of the positive 72 or the negative 74 signal portions from the absolute value circuit 62 are supplied to an accumulator 74, which adds up the successive digital values. More specifically, the accumulator 74 sums the sample values supplied to it during the time interval during which the read back signal exceeds a predetermined threshold voltage 58, determined by a threshold detector 76. It should be noted that although a specific threshold voltage is shown, in many applications, it may be desired to set the threshold to zero. Thus, the function of the threshold detector 76 may be served by a zero crossing detector. On the other hand, the use of a non-zero threshold may be desirable in some applications where, for example, the baseline 111 is misshaped or is otherwise difficult to detect due to noise, or the like.

Since the signal is effectively rectified by the absolute value circuit 62, in the embodiment illustrated, only a single threshold value 58 need be provided. Thus, the accumulator 74 essentially integrates the digital voltage values from the ADC of the read channel 24, producing a value that represents the energy contained in the read back signal during the time that the read back signal exceeds the predetermined threshold value 58.

Figure 4:
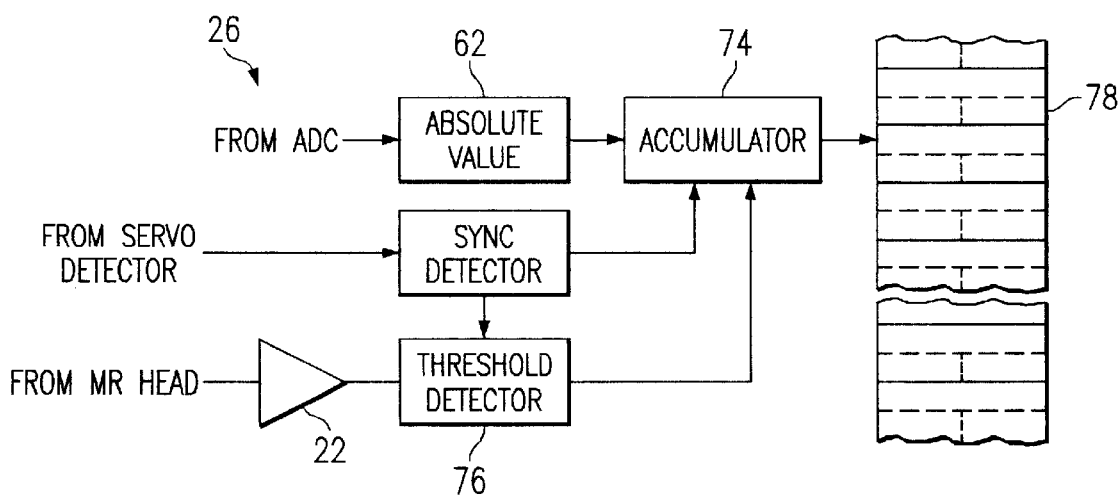
FIG. 4 is a block diagram showing a circuit for accumulating the energy values contained in positive and negative signal portions of the signal shown in FIG. 3, in accordance with a preferred embodiment of the invention.

With continued reference to FIG. 4, at the end of a time interval during which the accumulator 74 has been adding up sample values, the accumulated values or sums are transferred to a register array 78. Then, if desired, the accumulator 74 may be cleared to be ready to add up samples for another time interval, in a similar fashion to that above described. As the accumulator 74 acquires each accumulated value, it is inserted into an unused register of the register array 78.

On the other hand, the sample values for both the positive and negative portions of the MR head response 100 may be accumulated over the entire expanse of the disk with which the head is associated. In this embodiment, the total values may be stored in just two of the registers 78 for later use.

As mentioned, one of the inherent advantages of the invention is that it can be used to characterize the MR read head response to enable asymmetry configuration circuit to be configured to correct for asymmetries in the head. Thus, as a part of the characterization of the drive on which the particular MR head having the characteristic curves 110 and 112 is used, the method of the invention can be used to measure the energy contained in the positive and negative signal envelopes.

Figure 6:
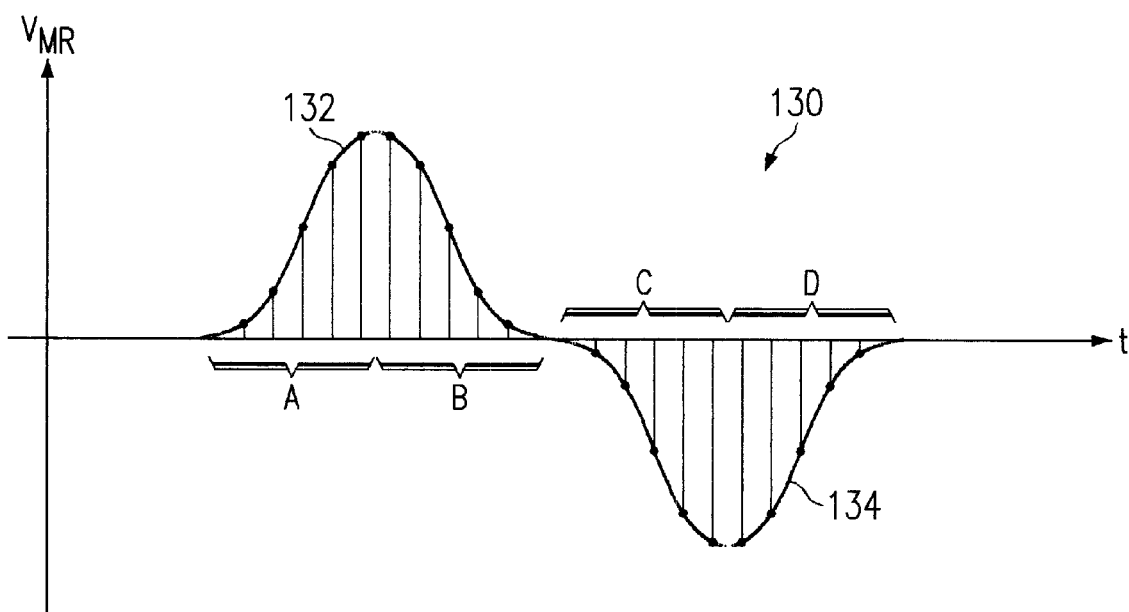
FIG. 6 is a graph of a response of an MR head that is sampled in sections to enable a timing or slope asymmetry to be measured, in accordance with another preferred aspect of the invention.

The basic method of the invention can be refined to measure head asymmetries by determining the slopes of the response curves, as illustrated in the graph 130 of FIG. 6, to which reference is now additionally made. The graph 130 shows positive 132 and negative 134 envelopes that are generated by an MR head in response to the continuous signals recorded on the disk 40. By appropriately controlling the thresholds of the detector and timing for initiating the accumulation of samples, the energies in respective portions A, B, C, and D of the signals 132 and 134 can be separately collected.

By comparing the energies of sections A and B, and C and D, the leading vs trailing or positive vs. negative pulse shape asymmetry can be precisely determined. Moreover, by applying multiple thresholds, the resolution of the measurement can be increased, as desired. In the past, this asymmetry has been compensated for in the continuous-time filter and/or the FIR of the read channel.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A method for characterizing asymmetries of a magneto-resistive type head in proximity to a magnetic media, comprising:
    using said magneto-resistive type head to read a continuous signal from said media to provide a read back signal;
    and determining energies contained in said read back signal occurring in excess of a predetermined threshold value for said positive and negative portions of said read back signal.

2. The method of claim 1 wherein said predetermined threshold value is zero.

3. The method of claim 1 wherein said continuous signal is a single frequency pattern written to the magnetic media.

4. The method of claim 3 wherein said single frequency pattern is an EPR4 pattern.

5. The method of claim 1 wherein said determining energies comprises accumulating sampled signal values from said read back signal during times at which said read back signal exceeds said threshold.

6. The method of claim 5 wherein said accumulating sampled signal values comprises accumulating sampled signal values at a rate at least as great as the Nyquist rate.

7. The method of claim 1 further comprising comparing energy contained in said read back signal in excess of said threshold value for said positive and negative portions of said read back signal.

8. The method of claim 7 wherein said comparing comprises comparing the read back signal to a voltage amplitude threshold.

9. The method of claim 1 wherein said determining energies contained in said read back signal comprises determining energies in respective portions of said read back signal, and further comprising comparing said determined energies to determine a leading vs. trailing pulse shape asymmetry.

10. The method of claim 1 wherein said determining energies contained in said read back signal comprises determining energies in respective portions of said read back signal, and further comprising comparing said determined energies to determine a positive vs. negative pulse shape asymmetry.

11. A method for characterizing asymmetries of a magneto-resistive type head in proximity to a magnetic media, comprising:
    writing a continuous signal onto said magnetic media;
    using said magneto-resistive type head, reading back said continuous signal to provide a read back signal;
    comparing positive and negative portions of said read back signal to a threshold value;
    and determining energies contained in said read back signal occurring above said threshold value for said positive and negative portions of said read back signal.

12. The method of claim 11 wherein said predetermined threshold value is zero.

13. The method of claim 11 wherein said continuous signal is a single frequency pattern written to the magnetic media.

14. The method of claim 13 wherein said single frequency pattern in an EPR4 pattern.

15. The method of claim 11 further comprising comparing energy contained in said read back signal which occurs in excess of said threshold value for said positive and negative portions of said read back signal.

16. The method of claim 15 wherein said comparing comprises comparing the read back signal to a voltage amplitude threshold.

17. The method of claim 11 wherein said determining energies comprises accumulating sampled signal values from said read back signal during times at which said read back signal exceeds said threshold.

18. The method of claim 17 wherein said accumulating sampled signal values comprises accumulating sampled signal values at a rate at least as great as the Nyquist rate.

19. The method of claim 11 wherein said determining energies contained in said read back signal comprises determining energies in respective portions of said read back signal, and further comprising comparing said determined energies to determine a leading vs. trailing pulse shape asymmetry.

20. The method of claim 11 wherein said determining energies contained in said read back signal comprises determining energies in respective portions of said read back signal, and further comprising comparing said determined energies to determine a positive vs. negative pulse shape asymmetry.

21. An apparatus for determining asymmetries of a magneto-resistive type head in proximity to a magnetic media, comprising:

a comparator for determining when positive and negative signals produced by said head in reading a continuous signal from said magnetic media exceed known thresholds;

and an energy determining circuit for measuring energies contained in said positive and negative read back signals when said read back signals exceed said thresholds.

22. The apparatus of claim 21 wherein said predetermined threshold value is zero.

23. The apparatus of claim 21 wherein said continuous signal is a single frequency pattern written to the magnetic media.

24. The apparatus of claim 23 wherein said single frequency pattern in an EPR4 pattern.

25. The apparatus of claim 21 wherein said energy determining circuit comprises a circuit for sampling said read back signals at least during times at which said read back signal exceeds said threshold to produce sampled signal values therefrom, and an accumulator for accumulating said sampled signal values.

26. The apparatus of claim 25 wherein said circuit for sampling said readback signals accumulates sampled signal values at a rate at least as great as the Nyquist rate.

27. The apparatus of claim 21 further comprising a comparator for comparing energy contained in said positive and negative read back signals occurring above said thresholds.

28. The apparatus of claim 21 wherein said energy determining circuit comprises means for determining energies in respective portions of said read back signal, and further comprising means for comparing the determined energies to determine a leading vs. trailing pulse shape asymmetry.

29. The apparatus of claim 21 wherein said energy determining circuit comprises means for determining energies in respective portions of said read back signal, and further comprising means for comparing the determined energies to determine a positive vs. negative pulse shape asymmetry.

* * * * *